United States Patent [19]

Yamamoto

[11] Patent Number: 5,795,007
[45] Date of Patent: Aug. 18, 1998

[54] AUTOMOBILE'S LUGGAGE FLOOR STRUCTURE

[75] Inventor: Tetsuya Yamamoto, Kanagawa, Japan

[73] Assignee: Isuzu Motors Limited, Tokyo, Japan

[21] Appl. No.: 689,078

[22] Filed: Jul. 30, 1996

[30] Foreign Application Priority Data

Jul. 31, 1995 [JP] Japan ................................ 7-243984

[51] Int. Cl.$^6$ ............................................ B62D 33/00
[52] U.S. Cl. ............................................ 296/39.2
[58] Field of Search ........................ 296/39.1, 39.2, 296/39.3, 187; 52/478

[56] References Cited

U.S. PATENT DOCUMENTS 5,007,670  4/1991  Wise ..................................... 296/39.1
5,188,418  2/1993  Walworth, Jr. et al. ................. 296/183

FOREIGN PATENT DOCUMENTS 2 098 934  12/1982  United Kingdom ............. B60R 5/04

*Primary Examiner*—Jesus D. Sotelo
*Attorney, Agent, or Firm*—Sughrue, Mion, Zinn, Macpeak & Seas, PLLC

[57] ABSTRACT

In an automobile's luggage chamber floor structure, a luggage floor panel 1 has relatively wide beads which are extended from near the front end of the panel to the rear end thereof, and a number of narrower beads are formed in the panel except for the vicinities of a cutting line and the rear end. The flanges of a rear end member which are welded to the rear end portion of the luggage floor panel is in the form of a series of ridges and grooves correspondence to the sectional configuration of the wide beads.

4 Claims, 6 Drawing Sheets

AUTOMOBILE'S LUGGAGE FLOOR STRUCTURE

BACKGROUND OF THE INVENTION

1. Field of the Invention

This invention relates to a floor structure which has a floor panel with a number of beads and a rear end member unit welded to the rear end of the floor panel, such as a floor structure in the luggage of a van type automobile and more particularly to an automobile's luggage floor structure made up of a single floor panel and a common rear end member unit.

2. Related Art

As shown in FIG. 8, a luggage floor panel 1a is provided at the bottom of a van type automobile's luggage room. As shown in FIG. 9, the luggage floor panel 1a is so shaped that its both side portions are partially cut away so as not to interrupt with wheel housings 27 which are adapted to cover the wheel tires 26 and the fuel filler (not shown). In addition, the luggage floor panel 1a has a number of beads 28 which are extended in a front-to-rear direction (longitudinally of the automobile). The beads 28 are extended near to the rear end of the floor panel, and the rear end portion of the panel is made flat (hereinafter referred to as "a flat portion 29", when applicable) so that a rear end member unit can be readily welded thereto. The rear end member unit, as shown in FIG. 10, includes a bar rear end member 16a and a closing rear end member 21a which have flat flanges 30 and 31, respectively. Those flat flanges 30 and 31 are set on the flat portion 29 of the luggage floor panel 1a, and the former 30 and 31 are welded to the flat portion 29 for instance by spot welding. The configuration of the beads may not be particularly limited; however, the configuration and the number of the beads are so determined as to provide a rigidity great enough to reinforce the luggage floor panel 1a.

FIG. 8 shows only one kind of van type automobile; however, there are available a variety of van type automobiles which are different in size —large size van type automobiles, middle size ones, and small size ones. In those van type automobiles different in size, their luggage floor panels 1a are different in length L (FIG. 9) from one another. More specifically, depending on the different lengths L of the van type automobiles different in size, their luggage floor panels are different in dimension a (FIG. 9); however, the other dimensions are substantially the same. The luggage floor panel 1a is large, and accordingly high in manufacturing cost. Hence, it is preferable to obtain a luggage floor panel which can be applied commonly to all sizes of van type automobiles. For this purpose, the following four methods (1) through (4) may be considered:

In the method (1), only one kind of luggage floor panel is formed, and it is used for all of the large-, middle- and small-size van type automobiles.

In the method (2), different luggage floor panels are formed by changing the dimension a according to the sizes of van type automobiles. Namely, the length b (FIG. 9) is cut away.

In the method (3), a luggage floor panel for a small van type automobile is formed as a common luggage floor panel for all sizes of van type automobiles, and the rear end member unit is changed according to the size of a given van type automobile.

In the method (4), the beads are formed in the floor panel except for the vicinity of the cutting line of the floor panel.

The method (1) is not practical, because if the method (1) is employed, then all sizes of van type automobiles are uniform in rear overhang, which greatly obstructs the designing of such automobiles.

The method (2) is preferable; however, it still involves the following problems: When the beads 28 are cut as shown in FIG. 11, then the rear end portion of the resultant luggage floor panel 1a becomes uneven like a series of ridges and grooves in alternate directions in correspondence to the configuration of the beads as indicated at 32 in FIG. 12, thus showing ridges and grooves (hereinafter referred to as "an uneven portion 32", when applicable). When the uneven portion 32 is laid over the flange surface 30, gaps are formed between the former 32 and the latter 30 as shown in FIG. 12. Hence, it is necessary to insert fillers 33 into the gaps thus formed. In addition, the leakage of water is liable to occur. The gaps may be eliminated according to the following method: The welding surface of the bar rear end member 16a is made uneven in correspondence to the uneven portion 32 as indicated at 34 in FIG. 13 (hereinafter referred to as "an uneven portion 34", when applicable), and the uneven portion 34 of the bar rear end member 16a is laid under the aforementioned uneven portion 32 of the luggage floor panel 1a. However, the method gives rise another problem. That is, since the beads are relatively small in width, it is rather difficult to bring the uneven portion 32 fully into contact with the uneven portion 34, with a result that the leakage of water is liable to occur. This problem may be solved by using a sealer. However, using a sealer may decrease the work efficiency, and increase the manufacturing cost.

In the method (3), as is seen from FIGS. 14 and 15, a common luggage floor panel is employed for all sizes of van type automobiles; however, different rear end member units are employed for different van type automobiles. Hence, the method (3) is disadvantageous in that the number of kind of rear end member units is increased, which increases the manufacturing cost, and makes the management of components intricate as much.

In the method (4), cutting line is determined separately according to the different size (large, middle and small) of van type automobiles, and no beads are formed in the panel of the vicinity of the cutting line; that is, a flat welding portion is provided along the cutting line which is coupled to the rear end member unit. According to the method (4), the luggage floor panel can be readily connected to the rear end member unit. However, the method (4) is disadvantageous in that the portion of the luggage floor panel where no beads are formed as was described above, is low in rigidity, which makes it necessary to reinforce that portion with a bolster. This means that the manufacturing cost is increased as much.

A conventional technique closely resembled to the above-described method (4) has been disclosed by Unexamined Japanese Utility Patent Publication No. 144779/1982. That is, in an automobile's floor structure disclosed thereby, a front floor panel has a flat welding portion, and a luggage floor panel also has a flat welding portion. Those flat welding portion is laid one on another, and secured to one another. Under this condition, a cross member is set under the flat welding portions, and its flanges are secured to the lower surfaces of the beads portion of the two panels. As was described, in the method (4), since it is necessary to use a reinforcing member, the work efficiency is lowered as much, and the manufacturing cost is increased accordingly.

SUMMARY OF THE INVENTION

In view of the foregoing, an object of the invention is to provide an automobile's luggage floor structure in which a common luggage floor panel and a common rear end member are employed for all sizes of van type automobiles, and the rigidity of the floor is maintained high without use of a special reinforcing member, and which can be formed with high work efficiency and at low manufacturing cost.

The foregoing object of the invention has been achieved by the provision of an automobile's luggage floor structure in which the floor panel is so configured that common rear end member unit can be welded either to the rear end portion of the floor panel or to the cutting portion where the panel has been cut along a predetermined cutting line for a smaller van type automobile. And the floor panel has a series of relatively wide beads and relatively narrow beads; the wide beads extend across the cutting line to the rear end of the panel, and narrow beads are formed in the panel except for the vicinities of the cutting line and the rear end of the panel.

The rear end member unit of the invention has a welding portion with a series of ridges and grooves which correspond to the sectional configuration of the wide beads in the rear end portion of the floor panel or one after cutting along the cutting line.

According to the invention, the luggage floor panel for large size van type automobile can be commonly used for smaller size van by cutting the panel to meet with automobile size. The luggage floor panel has a series of wide beads which are extended from near the front end of the panel to the rear end, and the beads which are formed in the panel except for the vicinities of the cutting line and the rear end. Hence, the rear end of the panel, or the section taken along the cutting line corresponds in configuration to the series of wide beads which provides a series of ridges and grooves in alternate directions. Hence, the welding portion of the rear end member unit can be completely fitted on the rear end portion of the luggage floor panel (which is cut as the case may be). Therefore, the former can be welded to the latter without gaps between them. That is, the floor structure of the invention using the common floor panel, and the rear end member unit may be applied to all sizes of van type automobiles.

DETAILED DESCRIPTION OF THE PREFERRED EMBODIMENTS

An automobile luggage floor structure, which constitutes a preferred embodiment of the invention, will be described with reference to the accompanying drawings.

Figure 1:
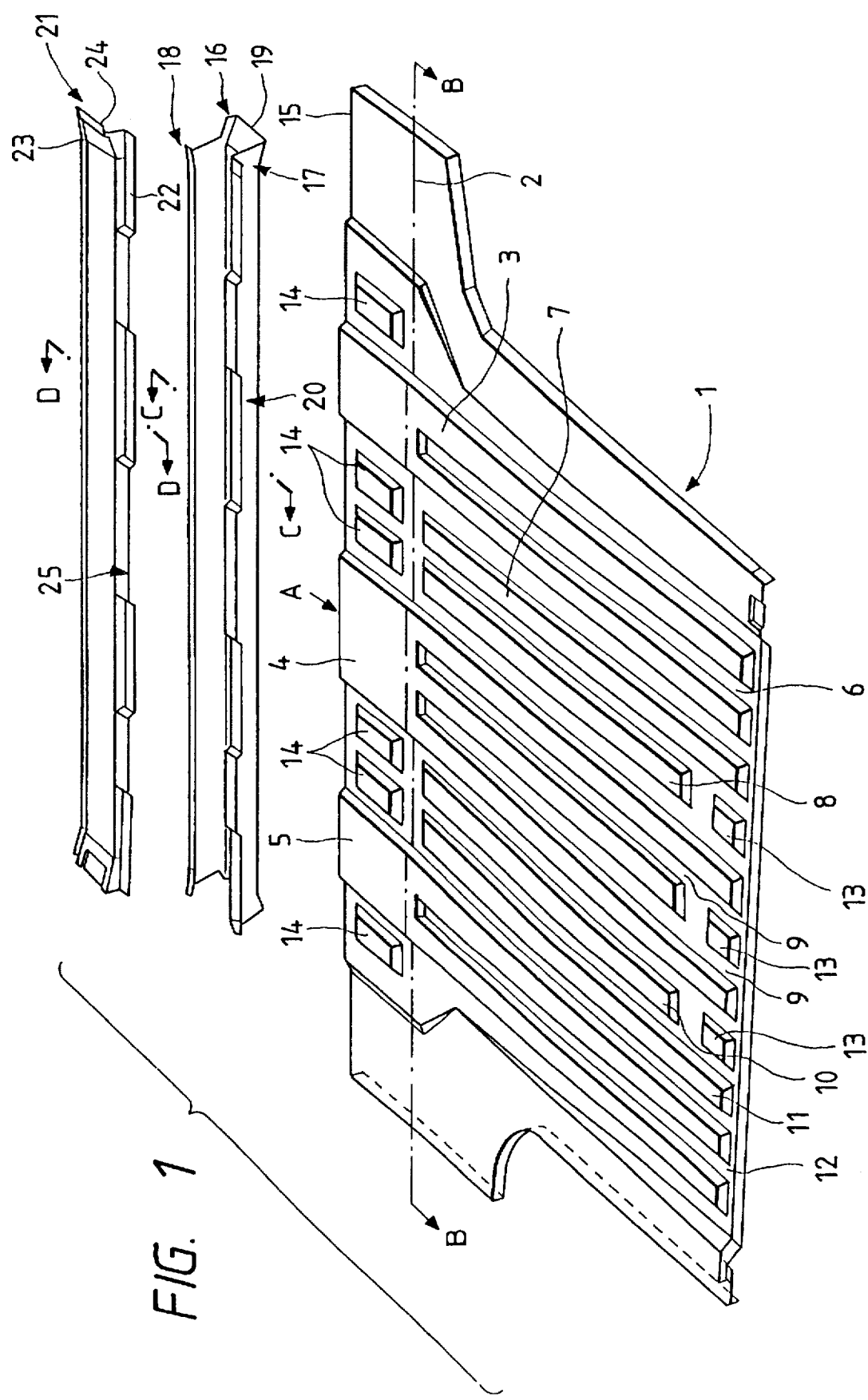
FIG. 1 is an exploded perspective view of an automobile's luggage floor structure, which constitutes a preferred embodiment of the invention, showing a luggage floor panel, and a rear end member unit comprising a bar rear end member and a closing rear end member.

As shown in FIG. 1, a luggage floor panel 1 is so shaped as not to interrupt with wheel housings which are adapted to cover the wheel tires and the fuel filler, and is dimensioned for a large size van type automobile. A cutting line 2 is for a small size van type automobile; that is, a luggage floor panel for the latter is formed by cutting the aforementioned luggage floor panel 1 along the cutting line 2.

The luggage floor panel 1 has wide beads 3, 4 and 5, and narrow beads 6 through 14. The wide beads 3 and 5 are equal in configuration to each other, and they are protruded upwardly and extended from near the front end of the panel 1 to the rear end 15 (hereinafter referred to as "ridge beads", when applicable). The remaining wide bead 4 is slightly larger in width than the wide beads 3 and 5, and is a ridge bead which is extended to the rear end of the panel 1. The beads 6 and 12 are like grooves which are extended from near the front end of the panel 1 near to the cutting line 2 (hereinafter referred to as "groove beads", when applicable). More specifically, the beads 6 and 12 are formed along the central axes of the wide beads 3 and 5, respectively. The beads 7 and 11 are ridge beads which are extended from near the front end of the panel 1 near to the cutting line 2. The beads 8 and 10 are each a ridge bead which is extended along the axis of the bead 13 formed near the front end of the panel 1 near to the cutting line in such a manner that a suitable distance is provided between the bead 13 and the starting end of the bead (8 or 10). The beads 9 and 9 are groove beads which are extended from the front end of the bead 4 near to the cutting line 2. The beads 14 are ridge beads which are extended from near the cutting line 2 near to the rear end 15 of the panel 1. More specifically, of the beads 14, a pair of rightmost and leftmost beads 14 are provided on right and left sides of the panel; and the remaining four beads 14 are positioned in alignment with the beads 7, 8, 10 and 11.

The luggage floor panel 1 is designed as described above. Hence, the beads extended across the cutting line 2 are only the wide beads 3, 4 and 5, and the rear end 15 includes only the wide beads 3, 4 and 5. The portion of the luggage floor panel, which is a vicinity of the cutting line 2, is reinforced by the wide beads 3, 4 and 5, and therefore the luggage floor panel 1, unlike the conventional one, is not lowered in rigidity.

Figure 2:
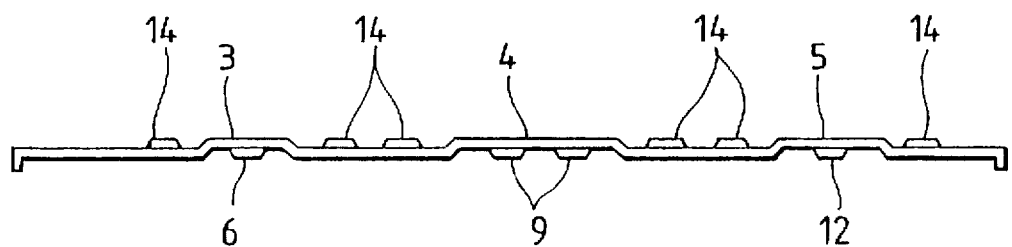
FIG. 2 is a diagram as view in the direction of the arrow A in FIG. 1.
Figure 3:
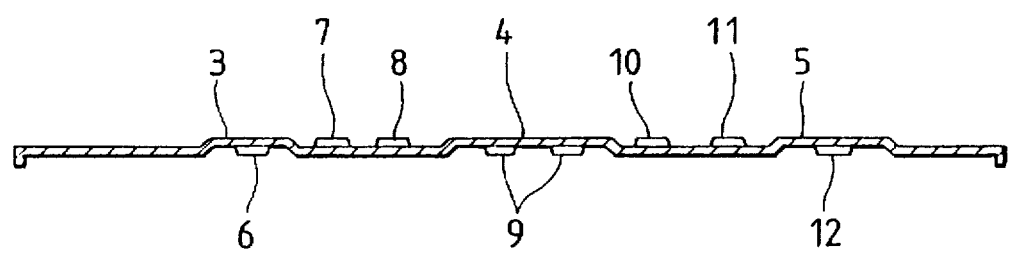
FIG. 3 is a sectional view taken along a cutting line 2 in FIG. 1.

FIG. 2 shows the uneven rear end 15 of the luggage floor panel 1 as viewed in the direction of the arrow A in FIG. 1. As is seen from FIG. 2, the wide beads 3, 4 and 5 are formed as was described above, and the ridge beads 14, and the groove beads 6, 9, 9 and 12 appear near the wide beads 3, 4 and 5. FIG. 3 is a sectional view taken along line B—B; i.e., the cutting line 2. The wide beads 3, 4 and 5 are formed similarly as in the case of FIG. 2, and the ridge beads 7, 8, 10 and 11, and the groove beads 6, 9, 9 and 12 appear near the wide beads 3, 4 and 5.

Figure 4:
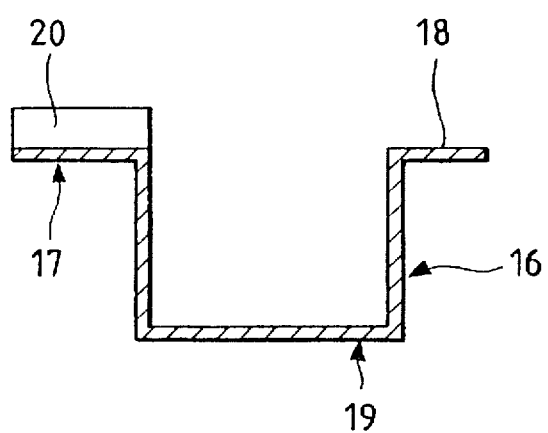
FIG. 4 is an enlarged sectional view of a bar rear end member taken along line C—C in FIG. 1.

As shown in FIGS. 1 and 4, in the embodiment, the bar rear end member 16 is substantially U-shaped in section comprising flanges 17 and 18, and a channel 19 U-shaped in section from which the flanges 17 and 18 are extended outwardly. The flange 17 is coupled to the luggage floor panel 1. The flange is formed into an uneven portion 20 which has a series of ridges and grooves corresponding to the uneven portion shown in FIGS. 2 or 3. Accordingly, the flange 17 can be welded either to the rear end 15 or to the cutting portion of the floor panel 1.

Figure 5:
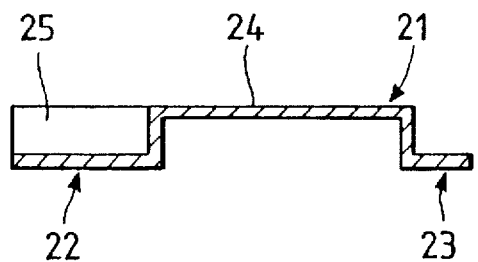
FIG. 5 is an enlarged sectional view of a closing rear end member taken along line D—D in FIG. 1.

As shown in FIGS. 1 and 5, the closing rear end member 21 is substantially inverted-U-shaped in section comprising flanges 22 and 23, and a shallow channel inverted-U-shaped in section from which the flanges 22 and 23 are extended. The flange 22 is coupled to the luggage floor panel 1 via flange 17, and has an uneven surface 25 which are in the form of a series of ridges and grooves corresponding to the uneven portion 20 of the flange 17.

Figure 6:
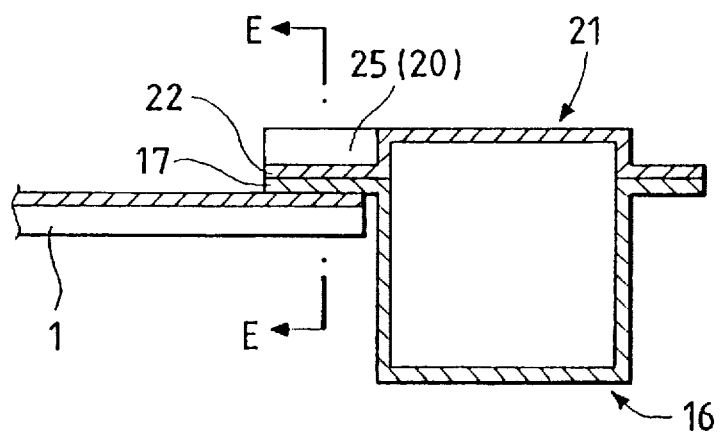
FIG. 6 is a sectional view showing the welding of the luggage floor panel to the rear end member.
Figure 7:
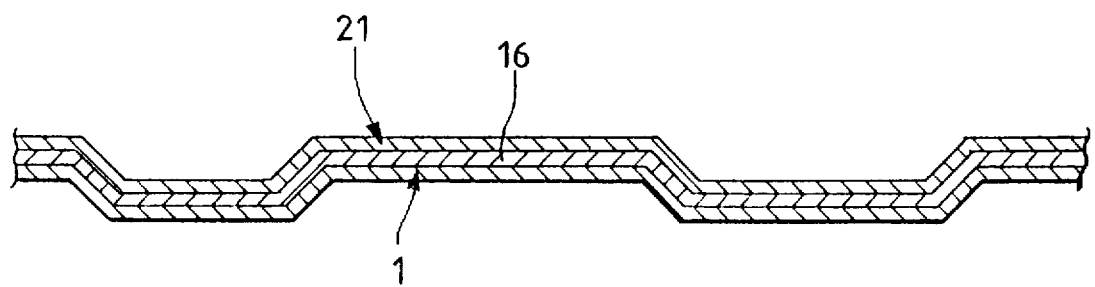
FIG. 7 is a sectional view taken along line E—E in FIG. 6.
Figure 8:
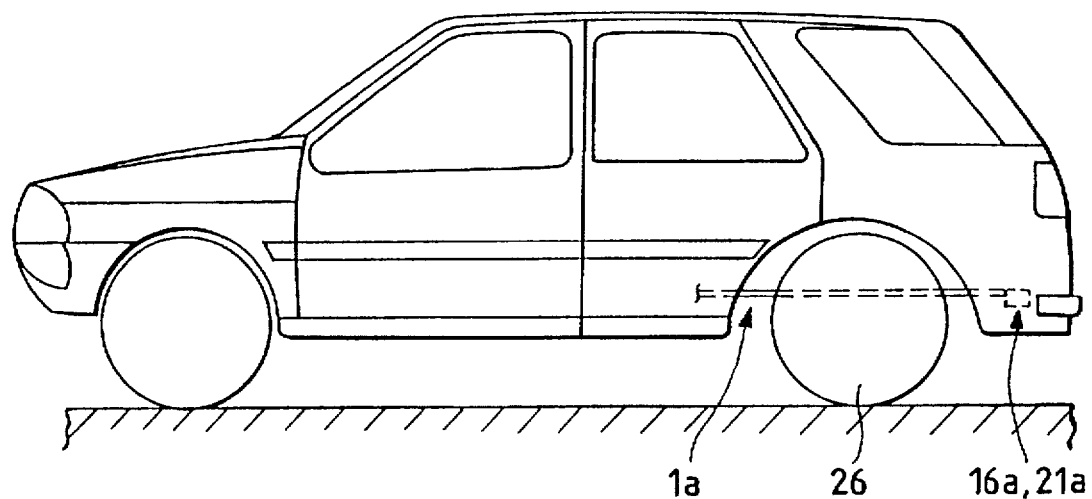
FIG. 8 is a side view of a van type automobile, outlining the arrangement of its luggage floor panel.
Figure 9:
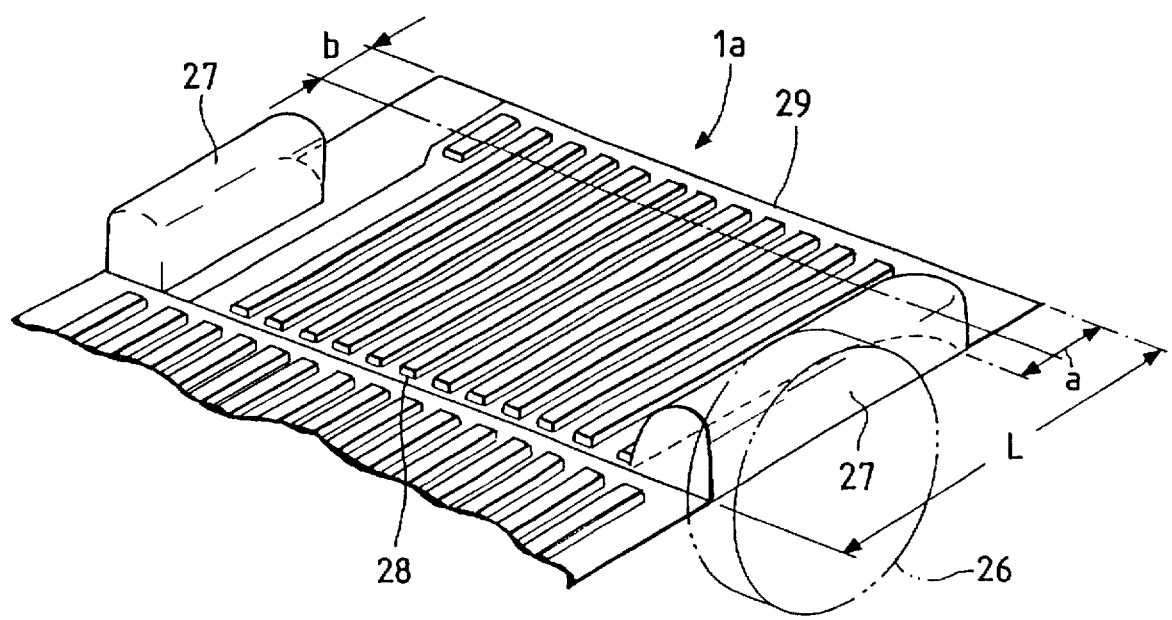
FIG. 9 is a perspective view of a conventional luggage floor panel.
Figure 10:
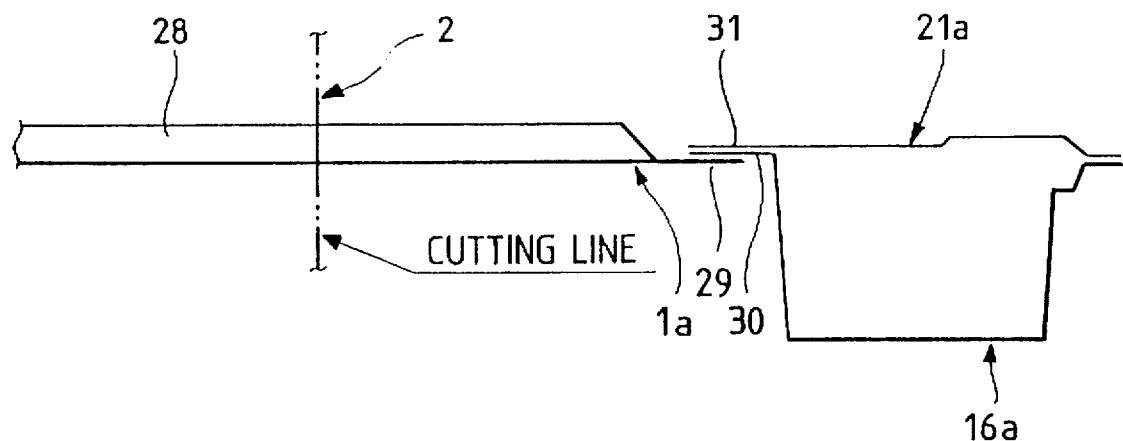
FIG. 10 is a fractional sectional view showing the welding of the conventional luggage floor panel to a conventional rear end member unit.
Figure 11:
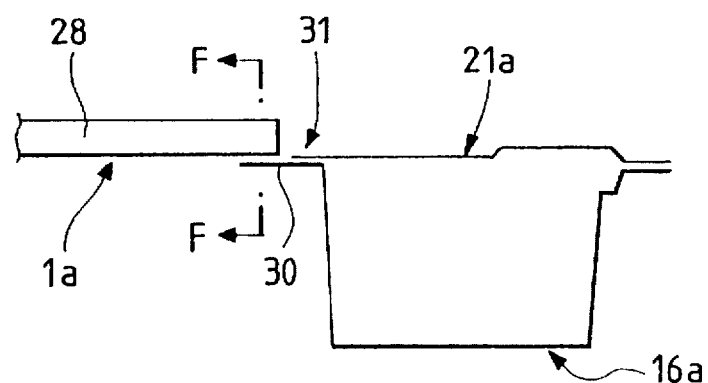
FIG. 11 is a fractional sectional view showing the case where the conventional luggage floor panel has been cut along the cutting line, and the conventional rear end member unit is welded to the rear end portion of the resultant panel.
Figure 12:
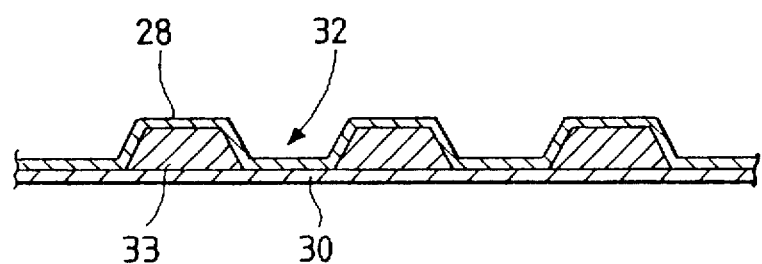
FIG. 12 is a sectional view taken along line F—F in FIG. 11.
Figure 13:
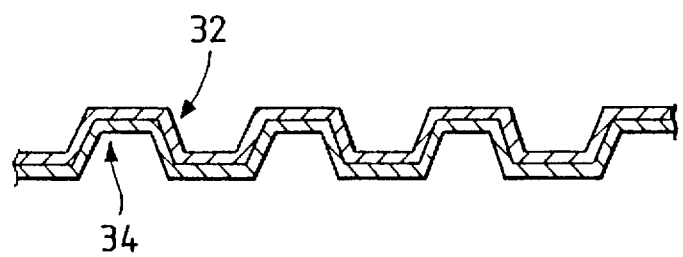
FIG. 13 is a sectional view showing the welding of the conventional rear end member unit to the conventional luggage floor panel in the case where the welding portion of the rear end member unit is so shaped as to correspond to the configuration of the section taken along the cutting line.
Figure 14:
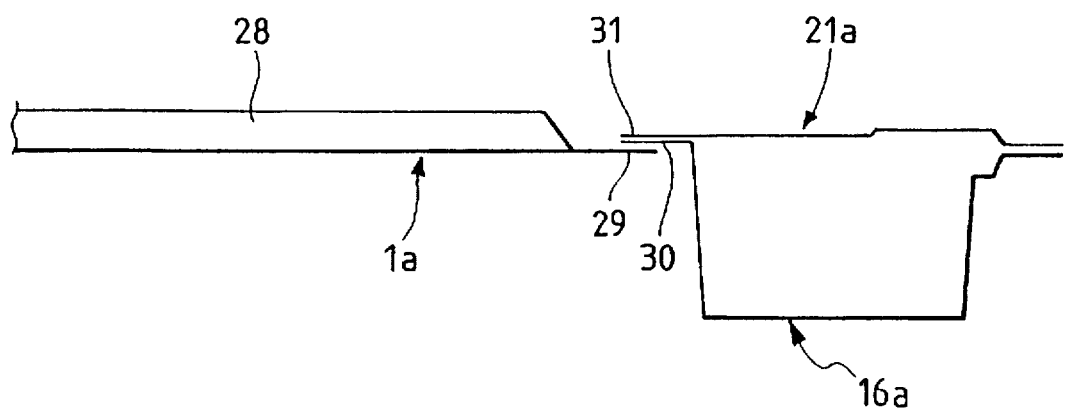
FIG. 14 is a fragmentary sectional view showing the welding of the conventional luggage floor panel to a rear end member which is not common for all sizes of van type automobiles.
Figure 15:
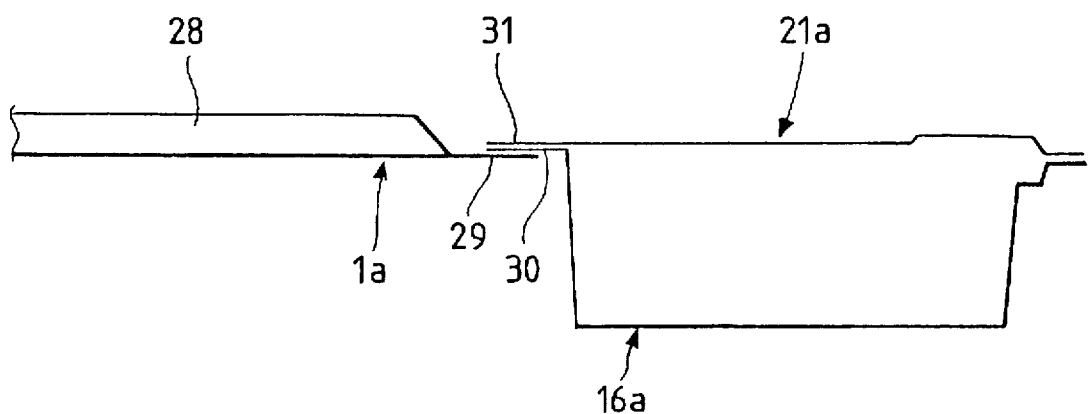
FIG. 15 is a fragmentary sectional view showing the welding of the conventional luggage floor panel to another rear end member which is also not common for all sizes of van type automobiles.

As shown in FIG. 6, the uneven portion 20 of the bar rear end member 16 and the uneven portion 25 of the closing rear end member 21 are laid on the uneven rear end portion of the luggage floor panel 1 or on the uneven rear end portion which is formed by cutting the latter 1 along the cutting line 2. FIG. 7 is a sectional view taken along line E—E in FIG. 6. As was described before, the rear end portion of the luggage floor panel 1 is equal in uneven configuration to the rear end which is formed by cutting the luggage floor panel along the cutting line 2. And the uneven configuration of those rear end corresponds to that of the uneven portion 20 of the bar rear end member 16 and to that of the uneven portion 25 of the closing rear end member 21. Thus, those three uneven portions are completely fitted to one another. The wide beads 3, 4 and 5 are larger in width than the beads 6, 7, etc. Hence, the aforementioned three uneven portions are large in welding surface, and they can be welded together in such a manner that they are fully in contact with one another.

In the above-described embodiment, the luggage floor panel has only one cutting line 2; however, the invention is not limited thereto or thereby. That is, it may have more than one cutting line. In addition, the configurations or the numbers of the beads etc. are not limited those which have been described above.

The automobile's luggage floor structure according to the invention has the following noticeable effects or merits:

(1) The wide beads are formed from near the front end of the floor panel to the rear end independently of the position of the cutting line, and no other beads are formed in the vicinity of the cutting line. Hence, the rear end of the floor panel and the section along the cutting line are equal to each other being in the form of a series of ridges and grooves which corresponds to the welding portion of the rear end member unit. Accordingly, the same rear end member unit can be applied to all sizes of van type automobiles. (2) The floor panel is maintained unchanged in rigidity by the series of the wide beads, and therefore no additional reinforcing member is required. This feature will decrease the manufacturing cost of the luggage floor. (3) The floor structure of the invention comprises a single floor panel and a single rear end member unit, which increases the work efficiency and decreases the manufacturing cost as much. (4) The rear end member unit can be welded to the floor panel with high accuracy, because the welding area become larger by applying wide beads. As a result, both welding strength and water-proof can be improved. (5) The common rear end member may be applied to all size of van type automobiles. This feature reduces the manufacturing cost, and makes it possible to readily manage the components.

What is claimed is:

1. An automobile's luggage floor structure comprising:

a luggage floor panel having a cutting portion located proximate to a rear end;

a plurality of first beads formed in said luggage floor panel and extending through said cutting portion and to said rear end of said luggage floor panel; and a plurality of second beads formed in said luggage floor panel and having narrower widths than said plurality of first beads and extending substantially parallel to said first beads, said second beads not extending through said cutting portion of said luggage floor panel;

wherein a sectional configuration of said cutting portion is similar to an end profile of said rear end.

2. An automobile's luggage floor structure as claimed in claim 1, further comprising:

a rear end member unit having a welding portion welded to a rear end portion of said luggage floor panel.

3. An automobile's luggage floor structure as claimed in claim 1, further comprising:

a rear end member unit having a welding portion welded to said cutting portion after having cut said luggage floor panel at said cutting portion.

4. An automobile's luggage floor structure as claimed in claim 1, wherein said end profile of said rear end comprises a series of ridges and grooves.

* * * * *